United States Patent [19]

Teramachi

[11] 4,417,771

[45] Nov. 29, 1983

[54] LINEAR BALL BEARING UNIT

[76] Inventor: Hiroshi Teramachi, 34-8, Higashi-Tamagawa 2-chome, Setagaya-ku, Tokyo, Japan, 158

[21] Appl. No.: 390,915

[22] Filed: Jun. 22, 1982

[51] Int. Cl.³ .............................................. F16C 29/06
[52] U.S. Cl. .................................... 308/6 C; 308/6 R
[58] Field of Search ............. 308/6 C, 6 R, 6 B, 6 A, 308/3 R

[56] References Cited

U.S. PATENT DOCUMENTS

| 4,040,679 | 8/1977 | Teramachi | 308/6 C |
| 4,253,709 | 3/1981 | Teramachi | 308/3 A |
| 4,296,974 | 10/1981 | Teramachi | 308/6 C |

Primary Examiner—Stuart S. Levy
Assistant Examiner—Thomas R. Hannon
Attorney, Agent, or Firm—George B. Oujevolk

[57] ABSTRACT

A linear ball bearing unit having a track shaft extending through the unit. The unit essentially comprises a bearing body with a pair of symmetrically located ball rows with retainer-cover assemblies secured to the end faces of the bearing body and having in integral combination a retainer and a cover, an upper slide member and a pair of symmetrically located side slide members. The upper slide member and side slide members are disposed between the bearing body and the track shaft. The retainer-cover assemblies are made of plastic or non ferrous metallic material such as a diecast alloy.

6 Claims, 6 Drawing Figures

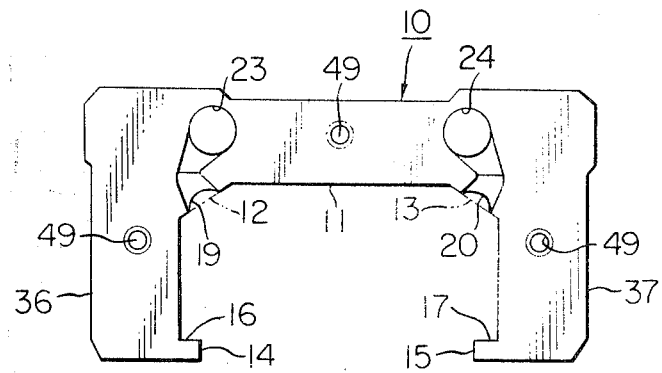
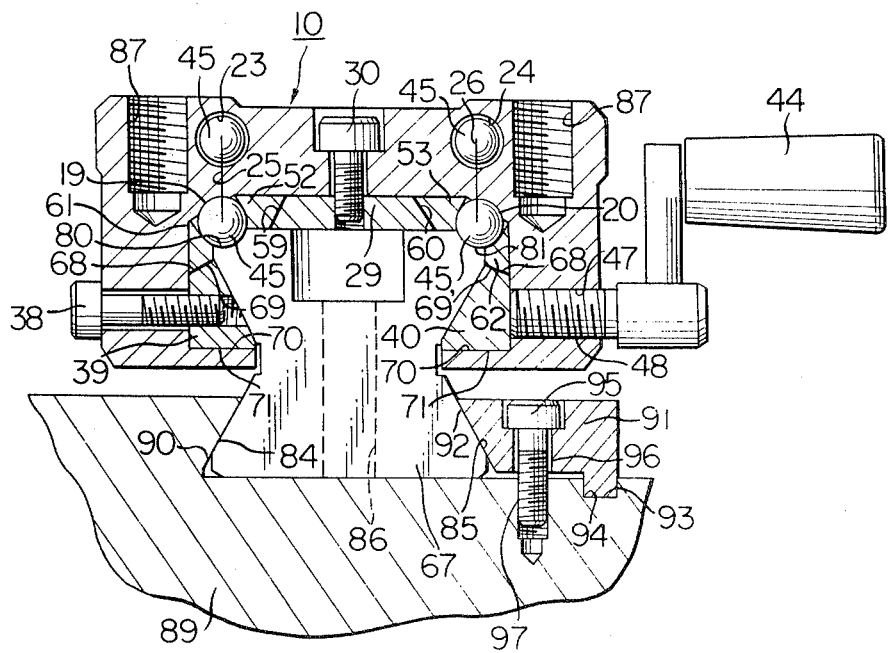

LINEAR BALL BEARING UNIT

BACKGROUND OF THE INVENTION

1. Field of the Invention

The present invention relates to a linear ball bearing unit and more particularly, to a linear ball bearing unit of the kind having a track shaft extending therethrough. The unit essentially comprise a bearing body with a pair of symmetrically located ball rows provided thereof, retainer-cover assemblies secured to the end faces of the bearing body and having in integral combination a retainer and a cover, an upper slide member and a pair of symmetrically located side slide members. The upper slide member and side slide members are disposed between the bearing body and the track shaft.

2. Description of the Prior Art

A linear ball bearing is usually constructed in such a manner that side covers at the end faces of the bearing body are formed separately from retainers which are incorporated in the bearing body (as shown in U.S. Pat. No. 4,040,679, U.S. Pat. No. 4,253,709 and U.S. Pat. No. 4,296,974).

The conventional retainers are made of steel plate by press working. They are so designed as to include a plurality of axially extending slits located at a predetermined position and tongues projected from both ends of the slits, these tongues are intended to scoop balls when the latter enter and leave the slit. Due to the structure of the retainers as described the tongues require high mechanical strength and wear resistivity.

To meet these requirements, a strong steel material is employed for the retainers. This steel material is subjected to heat treatment such as quenching, annealing or the like after completion of press working. As a result they are manufactured at a great cost.

When a machining operation is conducted for a workpiece firmly mounted on a carriage, the linear ball bearing onto which the carriage is fixedly secured is moved to a predetermined position and then it is locked. However, the conventional linear ball bearing requires a clamp mechanism for ensuring the locking of the carriage. This clamp mechanism is arranged separately from the bearing unit in such a manner as to effect clamping on the track shaft.

The arrangement of the clamping mechanism on a metal working machine causes the space which is occupied by the entire machine to be enlarged, resulting in increased inconvenience when operating the machine.

Thus, the present invention is intended to obviate the drawbacks inherent to the convention linear ball bearing units.

Objects of the Invention

Thus, it is an object of the present invention to provide a linear ball bearing unit which is so constructed that high mechanical strength and rigidity are not required for retainers and load carrying balls are smoothly scooped, wherein retainers and side covers are made of heat resistant synthetic plastics such as polycarbonate resin, polyester resin, polyacetal resin, polypropylene resin or non ferrous mettalic material such as a diecast alloy and they are integrally secured to one another so that load carrying ball guide spaces are formed in the retainers in such a manner as held in the bearing body by means of a plurality of slide members.

It is other object of the present invention to provide a linear ball bearing unit, wherein the bearing body includes a threaded hole provided on one of the side walls to receive a clamp screw adapted to be tightened by a handle in order to urge the slide member in the bearing body toward the sliding surface of the track shaft so that the bearing body is firmly clamped onto the track shaft.

It is another object of the present invention to provide a linear ball bearing unit, wherein the bottom portion of the track shaft is designed to correspond to the cross-sectional configuration of a bed such as V-shape, dovetail shape or the like so that the track shaft is firmly held on the bed by means of bolts.

It is still another object of the present invention to provide a linear ball bearing unit, wherein the track shaft has a lower portion which is designed in the form of a dovetail and one of the inclined faces on the dovetail-shaped lower portion comes in contact against an inclined face on a stepped part of the bed while the other one of the same is firmly depressed by means of a holder so that the track shaft is firmly held at a predetermined position on the bed.

SUMMARY OF THE INVENTION

To accomplish the above-mentioned objects there is proposed a linear ball bearing unit having a track shaft extending therethrough which has a bearing body including a cavity having a substantially rectangular cross-sectional configuration. This cavity is formed with a pair of oppositely located flanges at the lower part of the side walls and a pair of symmetrically located load carrying ball grooves having a radius of curvature substantially equal to one-half of the diameter of rolling balls at the upper end of the side walls thereof, said bearing body further includes two rows of non load carrying ball holes extending therethrough parallel to one another. These non load carrying ball holes are located at a predetermined distance upward of the load carrying ball grooves in vertical alignment with the latter; retainer-cover assemblies are fixedly secured to both the end faces of the bearing body; these retainer-cover assemblies comprising in integral combination a retainer and a cover and being formed with a U-shaped groove for reversing the direction of movement of the balls at the upper part of the inside wall of the cover, the upper part of said U-shaped groove serves as a continuation of the non load carrying ball hole while the lower part of the same being a continuation of the load carrying ball groove. The retainer of the retainer-cover assemblies comprises a pair of symmetrically located horizontal members and a pair of symmetrically located holding members both of which are integrally secured to the cover so that a load carrying ball guide space is formed therebetween in such a manner as to prevent the balls from falling down therefrom, said load carrying ball guide space having a radius of curvature substantially equal to the diameter of the balls. Both the horizontal members and the holding members of the retainer are provided with connecting means at the free end part thereof. A horizontal slide member is secured to the top wall of the cavity, said horizontal slide member having a substantially trapezoidal cross-sectional configuration of which inclined end faces correspond to those of the horizontal members of the retainer; and a pair of symmetrically located side slide members secured to the side walls of the cavity, said side slide members having a substantially triangular cross-sectional configuration and being located between the holding member and the flange while the upper inclined end face of said side slide members correspond to the lower inclined face of the holding member.

Further, according to another aspect of the present invention there is a locking mechanism for the linear ball bearing unit of the kind comprising a bearing body including a cavity having a substantially rectangular cross-sectional configuration, said cavity being formed with a pair of oppositely located flanges at the lower part of the side walls and a pair of symmetrically located load carrying ball grooves having a radius of curvature substantially equal to one-half of the diameter of the rolling balls at the upper end of the side walls thereof. The bearing body further includes two rows of non load carrying ball holes extending therethrough in parallel to one another, the non load carrying ball holes being located at a predetermined distance upward of said load carrying ball grooves in vertical alignment with the latter, wherein the bearing body includes two drilled holes and a threaded hole on one of the side walls thereof. The threaded hole is located intermediate the drilled holes so as to receive a clamp screw therein which is adapted to move inward to urge a side slide member in the cavity toward a side sliding face of the track shaft, so that the bearing body is firmly locked on the track shaft.

Other objects and advantages of the invention will be readily apparent from the following detailed description when taken on conjunction with the accompanying drawings, in which:

BRIEF DESCRIPTION OF THE DRAWINGS

FIG. 2 is a front view of a bearing body for the linear ball bearing unit in FIG. 1.

FIG. 3 is a cross-sectional view of the linear ball bearing unit.

DETAILED DESCRIPTION OF THE PREFERRED EMBODIMENT

Figure 1:
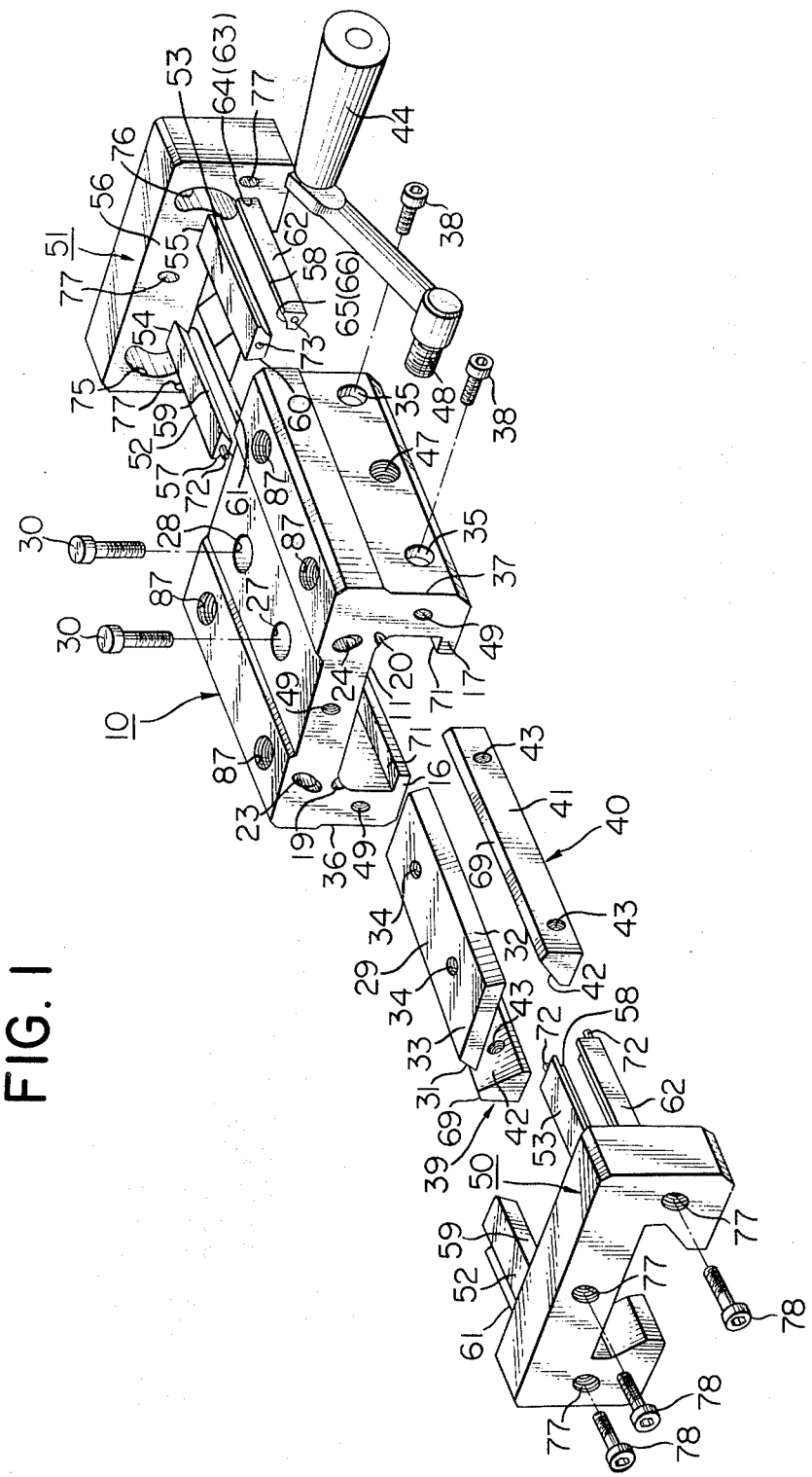
FIG. 1 is an exploded perspective view of a linear ball bearing unit in accordance with the present invention.

Now the present invention will be described in more details with reference to the accompanying drawings which illustrate a preferred embodiment of the present invention.

In the drawings reference numeral 10 designates a bearing body made of steel material such as bearing steel or the like. As is apparent from the drawings, the bearing body 10 is designed in a substantially rectangular configuration and includes a cavity open at the bottom thereof. Specifically, the cavity is formed of a combination of a top wall 11, a pair of inclined walls 12 and 13 (shown by phantom lines), a pair of side walls and a pair of flanges 16 and 17. The flanges 16 and 17 have open end faces 14 and 15 located opposite to one another.

The symmetrically located inclined walls 12 and 13 are formed with ball rolling faces, that is, load carrying ball grooves 19 and 20 extending in the axial direction and having a radius of curvature which is substantially equal to one-half of the diameter of the rolling ball, whereby a pair of symmetrically located ball rolling rows (two lines of load carrying ball grooves) are provided on the inside part of the bearing body 10.

Reference numerals 23 and 24 designate non load carrying ball holes extending in parallel to one another in the axial direction, said non load carrying ball holes 23 and 24 being spaced from the load carrying ball grooves 19 and 20 in the radial direction and being located in alignment with vertical lines 25 and 26 extending through the center of the balls adapted to roll on the grooves 19 and 20 (see FIG. 2).

Reference numerals 27 and 28 designate drilled holes extending through the bearing body 10, said drilled holes 27 and 28 being located substantially at the center of the top wall 11 and being spaced by a predetermined distance. Tightening bolts 30 are inserted through the drilled holes 27 and 28 and screwed into threaded holes on a horizontally extending slide member 29 so that the latter is fixedly secured to the top wall 11.

The horizontally extending slide member 29 has a trapezoidal cross-sectional configuration and includes a pair of symmetrically located inclined faces 31 and 32 and a horizontal face 33 on which two threaded holes 34 are provided.

Reference numerals 35 designate drilled holes provided on side walls 36 and 37 of the bearing body 10 separated by a predetermined distance therebetween. Set screws 38 are inserted through drilled holes 35 and screwed into threaded holes provided on side face slide members 39 and 40 so that the latter are firmly secured to the side walls 36 and 37.

The side face slide members 39 and 40 have a substantially triangular cross-sectional configuration and include an upper inclined face 69, a vertical face 41, and inclined face 42 and a lower horizontal face 70. Threaded holes 43 into which the set screws 38 are to be screwed extend from the vertical face 41 to the inclined face 42 (see FIG. 1).

Reference numeral 47 designates a threaded hole located intermediate the threaded holes 35 on the side wall 37 of the bearing body 10.

Reference numeral 48 designate a clamp screw adapted to be screwed into said threaded hole 47 by rotating a handle 44.

Reference numeral 49 designates a threaded hole provided on both the end faces of the bearing body 10 for the purpose of fixedly securing retainer-cover assemblies 50 and 51.

Reference numerals 52 and 53 designate a pair of symmetrically located horizontal members the base ends of which are firmly fixed to the end surface 56 of the side cover 51. Said horizontal members 52 and 53 include outer curved faces 57 and 58 extending in the axial direction which have a radius of curvature substantially equal to a half of the diameter of the ball 45. Further, the horizontal members include inner inclined faces 59 and 60.

Reference numerals 61 and 62 designate a pair of symmetrically located holding members the base ends of which are firmly fixed to the end face 56 of the side cover 51. Said holding members 61 and 62 include upper curved faces 65 and 66 formed symmetrically relative to the outer curved faces 57 and 58 of the horizontal members 52 and 53 so as to serve as load carrying ball guide means for preventing the balls 45 from falling down when a track shaft 67 to be described later is disconnected.

Reference numeral 69 designate an upper inclined face on the side slide members 39 and 40 formed corresponding to the lower inclined faces 68 of the holding members 61 and 62.

Reference numeral 70 designates a lower horizontal face of the side slide members 39 and 40 which is adapted to coincide with the horizontal face 71 of the flanges 16 and 17 on the bearing body 10 (see FIG. 3).

Reference numeral 72 designate an engagement pin which serves as one of connecting means. Said engagement pin 72 is projected from the free end of the horizontal member 53 and the holding member 62 located on the left side as seen from the end face of the bearing body 10. On the other hand, drilled hole 73 is provided on the free end of the horizontal member 53 and the holding member 62 located on the right side as seen from the end face of the bearing body 10 so as to receive the engagement pin 72. It should be noted that another connecting means for connecting both the free ends of the horizontal members or the holding members is an epoxy based adhesive agent.

Figure 4:
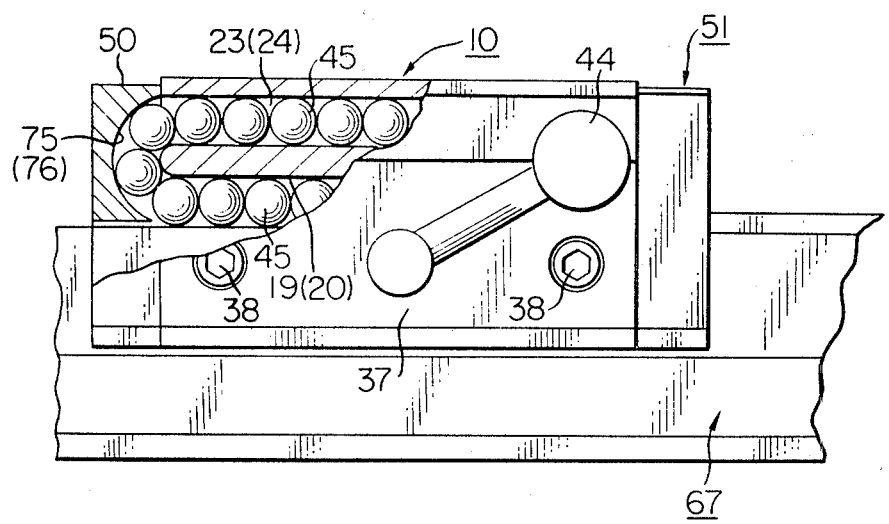
FIG. 4 is a partially sectioned side view of a part of the linear ball bearing unit, illustrating the movement of balls.

Reference numerals 75 and 76 designate a U-shaped groove formed on the end face 56 of the side cover 51 so as to reverse the direction of movement of the balls. As is apparent from FIG. 1, the lower part of the U-shaped grooves 75 and 76 is located intermediate the outer face of the horizontal members 52 and 53 and the upper face of the holding members 61 and 62. Further, the lower part of the U-shaped grooves 75 and 76 is in continuation with the load carrying ball grooves 19 and 20, whereas the upper part of the same is in continuation with the non load carrying ball holes 23 and 24 (see FIGS. 1 and 4).

A side cover 50 is disposed symmetrically relative to the side cover 51.

Reference numeral 77 designates a drilled hole extending through the retainer-cover assemblies 50 and 51. Tightening bolts are inserted through said drilled holes 77 and screwed into threaded holes on the end faces of the bearing body 10 so that the retainer-cover assemblies 50 and 51 are firmly secured to the bearing body 10.

Figure 5:
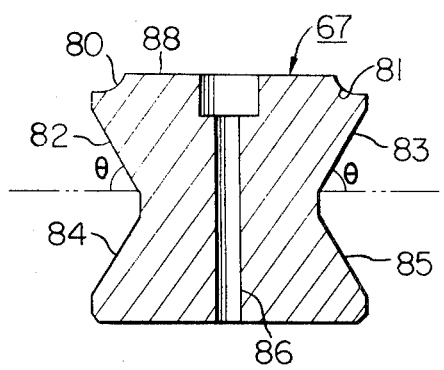
FIG. 5 is a cross-sectional view of a track shaft on which the bearing body is slidably mounted.

Reference numeral 67 designates a substantially X-shaped track shaft to be assembled into the linear ball bearing unit in accordance with the present invention. The track shaft 67 includes an upper flat face 88 and a pair of symmetrically located shoulders at which load carrying ball grooves 80 and 81 having a radius of curvature substantially equal to a half of the diameter of ball are formed corresponding to the load carrying ball grooves 19 and 20 on the bearing body 10. Thus, the load carrying balls roll on the rolling faces provided by the aforesaid load carrying ball grooves 19, 20 and 80 and 81 (see FIG. 5).

Reference numerals 82 and 83 designate inclined faces on both the side walls of the track shaft 67. An angle $\theta$ involved by the inclined face 82 or 83 and the horizontal plane is designed to be same to that of the inclined face 42 on the side slide members 39 and 40.

Reference numerals 84 and 85 each designate another inclined face located opposite to the upper inclined faces 82 and 83. The lower inclined faces 84 and 85 have the same inclination angle as that of the upper ones (see FIG. 3).

Reference numeral 86 designate a through hole which serves for allowing a fastening bolt (not shown) to be extended therethrough so as to fixedly mount the track shaft 67 on a moving member or stationary member of a machine tool or the like (not shown).

Reference numeral 87 designates a threaded hole which serves to allow a tightening bolt (not shown) to be screwed thereto so as to fixedly secure the bearing body 10 to a machine tool or the like (not shown).

The parts and members for the linear ball bearing unit in accordance with the present invention are designed and constructed in the above-described manner. Now assembling of these parts and members will be described.

First, the horizontal slide member 29 is fixedly secured to the top wall 11 in the cavity of the bearing body 10 by means of the set screws 30, and then the side slide members 39 and 40 are fixedly secured to the inside surfaces of the side walls 36 and 37 of the bearing body 10 by means of the set screws 38. Next, the retainer-cover assembly 50 is fitted into the cavity and fastened to the end face of the bearing body 10 by means of the tightening bolts 78.

A number of balls 45 are charged into the bearing body 10 by way of the non load carrying ball holes 23 and 24 until the U-shaped grooves 75 and 76 and the retainers and the retainers are filled therewith.

Next, the other retainer and cover assembly 51 is fitted into the cavity of the bearing body 10 while it is filled with the balls 45. During the insertion of the retainer-cover assembly 51 the engagement pins 72 on the free end part of the one retainer are fitted into the engagement holes 73 on the free end part of the other retainer, whereas the engagement pins 72 on the free end part of the other retainer are fitted into the engagement holes 73 on the free end part of the one retainer.

Then, the retainer-cover assembly 51 is fixedly secured to the bearing body 10 by means of the tightening bolts 78 which are inserted through the drilled holes 77 and screwed into the threaded holes 49. Next, as illustrated in FIG. 3, by tightening the set screws 30 the horizontal slide member 29 is firmly fastened to the top wall 11 in the cavity of the bearing body 10 in such a manner that the inclined faces of the horizontal members 52 and 53 are urged upwardly by means of the inclined faces 31 and 32 of the horizontal slide member 29. Further, by tightening the set screws 38 the side slide members 39 and 40 are firmly fastened to the side walls of the bearing body 10 in such a manner that the lower inclined faces 68 of the holding members 61 and 62 are urged upwardly by means of the upper inclined faces 69 of the side slide members 39 and 40. Thus, the required load carrying ball grooves are provided. Then, the track shaft 67 is inserted through the cavity and thereby the assembling of the linear ball bearing unit is completed.

Next, one of typical methods of fixedly mounting the track shaft 67 on a bed 89 of a machine tool or the like will be described below with reference to FIG. 3.

An inclined face 84 on the track shaft 67 is caused to come in contact against an inclined face 90 on a stepped portion of the bed 89, whereas other inclined face 85 of the same is depressed by means of an inclined face 92 of a holder 91.

The holder 91 includes a projection 93 located in the opposite position to the inclined face 92 thereof, said projection 93 being adapted to be engaged into a groove 94 on the bed 89.

Reference numeral 95 designates a tightening bolt which is inserted through a drilled hole 96 on the holder 91 and screwed into a threaded hole 97 on the bed 89.

Figure 6:
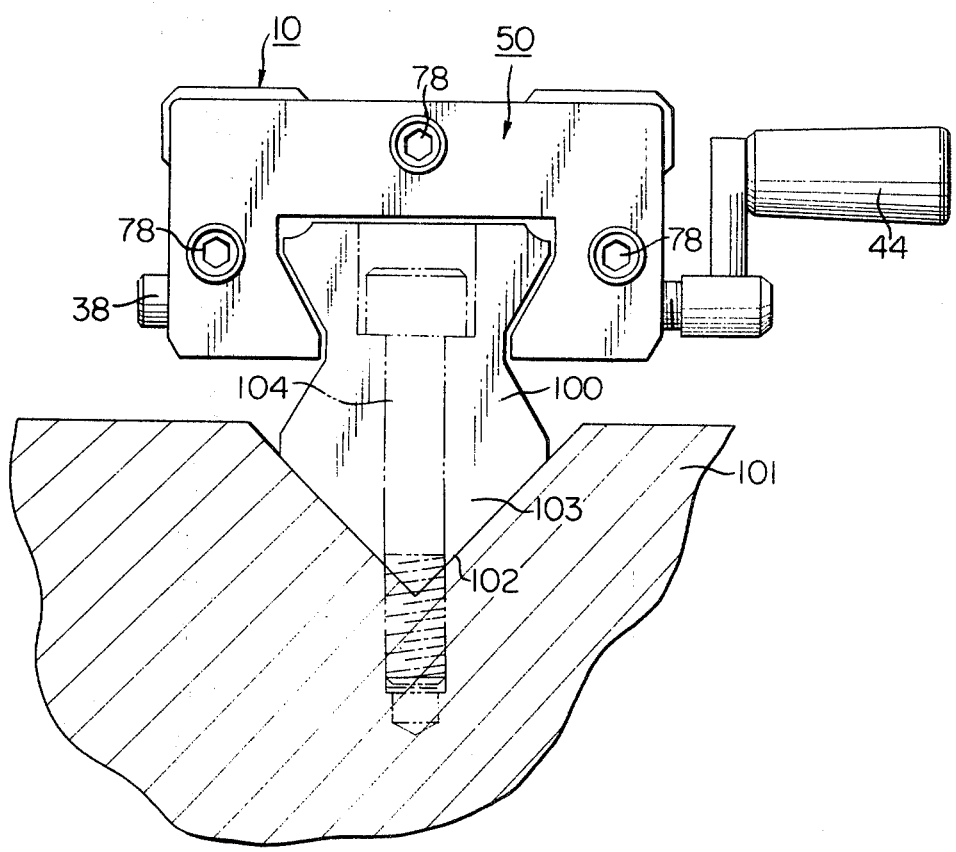
FIG. 6 is a front view of the linear ball bearing unit slidably mounted on a track shaft which is designed in a different cross-sectional configuration from that in FIG. 5.

FIG. 6 illustrates another method of firmly mounting a track shaft 100 on a bed 101.

Specifically, the bed 101 is formed with a V-shaped groove 102 and the track shaft 100 includes a V-shaped lower extension 103 having a cross-sectional configuration corresponding to that of the groove 102. Thus, by fitting the lower extension 103 into the groove 102 and tightening the bolt 104 the track shaft 100 is fixedly mounted on the bed 101.

Since the linear ball bearing unit is constructed in the above-described manner and the retainers in the unit have a wide bearing area, it is ensured that circulative movement of the balls through the load carrying ball groove, the U-sheped groove and the non load carrying ball hole is carried out very smoothly particularly owing to scooping function along the U-shaped groove, when the unit is mounted on the track shaft and then it moves forward and backward.

Further, since an arrangement is made such that any high thrust load or upward load (floating load) is satisfactorily borne by means of either of the side slide members or the horizontal slide member, it is ensured that smooth movement of the bearing body takes place even when such a high thrust or upward load is applied to the unit.

Further, since an arrangement is made such that the retainer designed integrally with the side cover is held at the predetermined position in the cavity with the aid of the horizonal slide member and the side slide members, it is ensured that movement of the balls takes place without any excessively tight contact with the retainer during circulative movement of the balls.

Provided that the bearing body is fastened to a carriage on which a cutter or the like is mounted and a certain machining operation is to be conducted while the carriage is stationarily held at a predetermined position on the track shaft, the bearing body is fixedly secured to the track shaft.

First, the handle is rotated in the predetermined direction to drive the clamp screw forward and thereby the one of the side slide member is resiliently deformed at the central part thereof. As the side slide member is caused to bend inward at the central part, it is brought in tight contact against the inclined face on the track shaft. The bearing body is deformed to an appreciable extent and thereby the other members on the bearing body are deformed correspondingly. As a result the bearing body is firmly held on the track shaft whereby precise machining is ensured without any movement of the carriage during the whole machining operation.

The bearing body is made of expensive special steel such as bearing steel or the like, but the retainer-cover assemblies may be integrally molded of plastic material or non ferrous metallic material. Thus, the linear ball bearing unit is easy to assemble so that it is possible to manufacture the unit at a reduced cost.

What is claimed is:

1. A linear ball bearing unit of the kind which includes a track shaft extending therethrough, essentially comprising:

a bearing body including a cavity having a substantially rectangular cross-sectional configuration, said cavity being formed with a pair of oppositely located flanges at the lower part of the side walls and a pair of symmetrically located load carrying ball grooves having a radius of curvature substantially equal to one half of the diameter of the rolling balls at the upper end of the side walls thereof, said bearing body further including two lines of non load carrying ball holes extending therethrough in parallel to one another, said non load carrying ball holes being located at a predetermined distance upward of said load carrying ball grooves in vertical alignment with the latter, retainer-cover assemblies fixedly secured to both the end faces of the bearing body, said retainer-cover assemblies comprising in integral combination a retainer and a cover and being formed with an U-shaped groove for reversing the direction of movement of the balls at the upper part of the inside wall of the cover respectively, the upper part of said U-shaped groove being in continuation with the non load carrying ball hole while the lower part of the same being in continuation with the load carrying ball groove, the retainer of said retainer-cover assemblies comprising a pair of symmetrically located horizontal members and a pair of symmetrically located holding members both of which are integrally secured to the cover so that a load carrying ball guide space is formed therebetween in such a manner as to prevent the balls from falling down therefrom, said load carrying ball guide space having a radius of curvature substantially equal to the diameter of the balls, both the horizontal members and the holding members of the retainer being provided with connecting means at the free end part thereof respectively at which they come in abutment against the oppositely located one, a horizontal slide member fixedly secured to the top wall of the cavity, said horizontal slide member having a substantially trapezoidal cross-sectional configuration of which inclined end faces correspond to those of the horizontal members of the retainer, and a pair of symmetrically located side slide members fixed to the side walls of the cavity, said side slide members having a substantially triangular cross-sectional configuration and being located between the holding member and the flange while the upper inclined end face of said side slide members corresponding to the lower inclined face of the holding member.

2. A linear ball bearing unit as defined in claim 1, wherein the bearing body is made of metallic material.

3. A linear ball bearing unit as defined in claim 1, wherein the retainer-cover assemblies are made of plastic material such as synthetic plastics.

4. A linear ball bearing unit as defined in claim 1, wherein the retainer-cover assemblies are made of non ferrous metallic material such as diecast alloy.

5. A linear ball bearing unit as defined in any of claims 1 to 4, wherein the connecting means at the free end part of the horizontal members and the holding members comprise a combination of an engagement pin or the like and a drilled hole adapted to recieve said engagement pin or the like.

6. A linear ball bearing unit as defined in any of claims 1 to 4, wherein the connecting means at the free end part of the horizontal members and the holding members comprise an adhesive agent.

* * * * *